Sept. 11, 1956  E. M. GLADROW ET AL  2,762,792
PURIFICATION PROCESS FOR PETROCHEMICALS
Filed Dec. 31, 1952
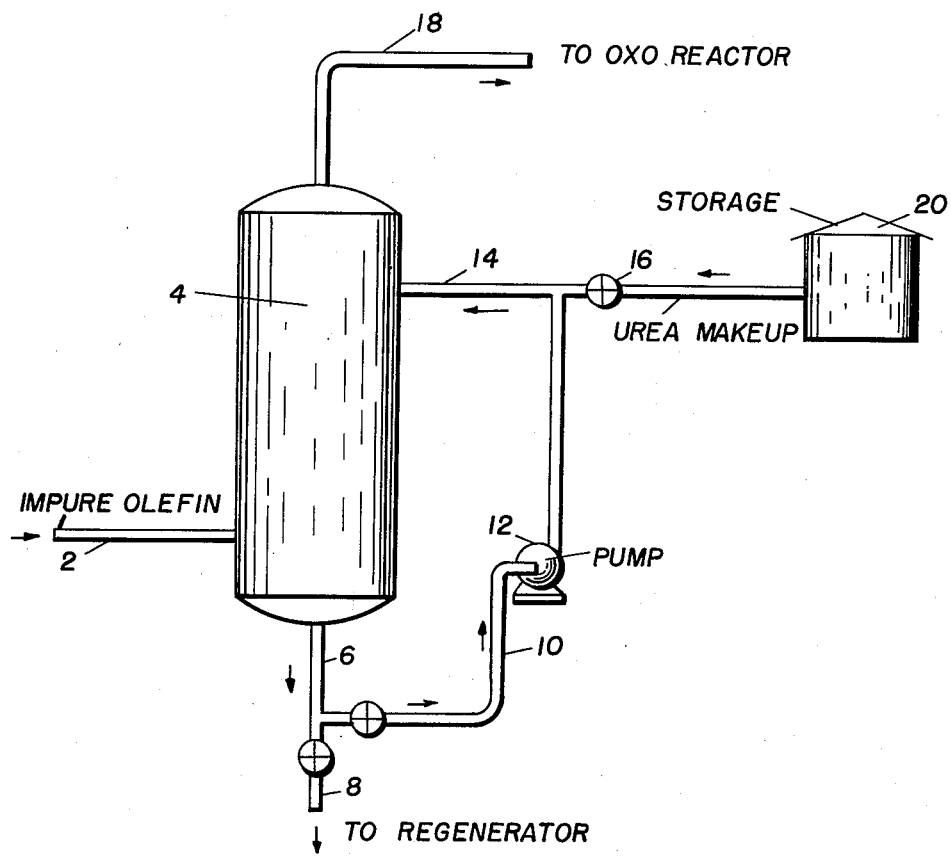
ELROY M. GLADROW
AUGUSTUS B. SMALL    Inventors
By  *Henry Berk*    Attorney

United States Patent Office 2,762,792
Patented Sept. 11, 1956

2,762,792
PURIFICATION PROCESS FOR PETROCHEMICALS

Elroy M. Gladrow and Augustus B. Small, Baton Rouge, La., assignors to Esso Research and Engineering Company, a corporation of Delaware Application December 31, 1952, Serial No. 328,924

10 Claims. (Cl. 260—96.5)

The present invention relates to the preparation of oxygenated organic compounds from olefins by reacting the latter with CO and $H_2$ in the presence of carbonylation catalysts. More specifically, the present invention relates to the purification of the olefin feed employed in this process to produce an alcohol product of high purity.

The synthesis of oxygenated organic compounds from olefinic compounds and mixtures of CO and $H_2$ in the presence of a catalyst containing metals of the iron group such as cobalt or iron, preferably the former, is well known in the art. In the first stage, the olefinic material, catalyst and the proper proportions of CO and $H_2$ are reacted to give a product consisting essentially of aldehydes containing one more carbon atom than the reacted olefin. This oxygenated organic mixture, which contains dissolved in it, salts and the carbonyls and molecular complexes of the metal catalyst, is treated in a second stage to cause removal of soluble metal compounds, such as carbonyls, from the aldehyde product in a catalyst removal zone. The catalyst-free aldehyde product is then generally hydrogenated to the corresponding alcohols.

This carbonylation reaction provides a particularly attractive method for preparing valuable primary alcohols which find large markets particularly as intermediates for plasticizers, detergents and solvents. Amenable to the reaction are long and short chain olefinic and oxygenated olefinic compounds. Thus, straight and branched chained olefins and diolefins, propylene, butylene, styrene, olefin polymers such as di- and tri-isobutylene, polypropylene fractions, olefinic fractions from thermal or catalytic cracking processes and the like, may be used as starting materials.

The catalyst in the first stage may be added as oil soluble salts of the catalytically active metal with high molecular weight fatty acids, such as oleic, stearic, naphthenic, and the like, or it may be added as a slurry of the metal or its compounds, or as the carbonyl. Inasmuch as the active catalyst is probably the hydrocarbonyl of the metal, such as cobalt hydrocarbonyl, most forms of the metal may be employed as catalyst, and these are converted into the active species in the course of the reaction.

The synthesis gas mixture fed to the first stage may consist of any ratio of $H_2/CO$, preferably the gases are present in about equal volumes. The conditions for reacting $H_2$ and CO vary somewhat in accordance with the nature of the olefin feed and catalyst form, but the reaction is generally conducted at about 2000–4500 p. s. i. g., and at temperatures in the range of about 250°–450° F. The ratio of synthesis gas to olefin feed may vary widely; in general about 2500 to 15,000 cu. ft. of $H_2$ and CO per barrel of olefin feed are employed.

Following the carbonylation stage, the aldehyde product, containing in solution a considerable amount of dissolved catalyst in the form of carbonyl and other compounds, is generally treated at elevated temperatures in the presence of a gas or vapor, such as hydrogen or steam, to decompose the carbonyl to an oil-insoluble form of cobalt or other metal, and drive off CO formed. Thereafter, the aldehyde product is freed of suspended catalyst metal or compounds, and is passed to a hydrogenation zone for conversion into alcohols.

The hydrogenation stage may be operated at conventional hydrogenation conditions including temperatures, pressures, and gas and liquid feed rates of the same order of magnitude as those obtaining in the first, or carbonylation stage. Various known types of catalyst, such as nickel, tungsten, molybdenum and their oxides or sulfides, supported or unsupported, may be used.

The liquid product from the primary hydrogenation stage is worked up by distillation to separate the desired alcohols from unconverted olefinic feed material, unhydrogenated carbonyl compounds, and hydrocarbons formed in the process. The sulfide catalysts have been found to be especially useful for carrying out this hydrogenation.

The overall carbonylation or so-called "Oxo" reaction as outlined above, provides a particularly effective method for preparing valuable primary alcohols, particularly of the $C_4$ to $C_{20}$ range, which find large markets as intermediates for detergents and plasticizers. The $C_8$ and $C_9$ Oxo alcohol products are especially preferred for use in forming esters to be used as plasticizers in light colored or colorless plastics and resins.

One of the largest and most important uses developed for the synthetic alcohol products is that of producing esters suitable for plasticizers, by reaction with aliphatic, alicyclic, and aromatic acids or anhydrides, including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols from $C_4$ to $C_{20}$ range such as the butyl alcohols, the octanols, and the nonanols.

These esters are prepared in standard type esterification equipment employing reactors made of stainless steel or other metal, or in some cases, in glass-lined reaction vessels. In some instances, particularly when the esters were produced in reactors having metallic surfaces exposed to the reacting mixtures, the products were found to be deficient as to the standards required for plasticizers, in such characteristics as odor, color, and plasticizing qualities such as the poor weathering tendency of the resins and plastics in which such plasticizers are used. These undesirable characteristics have been traced to impurities present in the alcohol product and certain of them are caused particularly by minor amounts of sulfur products present in the alcohol. It has further been discovered that when sulfur compounds, especially those of the acidic type, are allowed to remain in impure alcohol or aldehyde, they act as catalysts for causing increased condensation reactions which produce acetals and other high molecular weight impurities of the undesirable type. In fact, it has been found that, in order to obtain a high grade alcohol which adequately meets all specifications, the active, color-producing sulfur content should best be reduced to a value somewhere near five parts per million although somewhat higher total sulfur concentrations can be tolerated, the exact limit of tolerance depending upon the form in which the sulfur occurs.

In general, the sulfur in the synthetic Oxo alcohols is in the form of organically combined sulfur. Although all types of organic impurities in which the sulfur occurs have not been fully determined, it is belived that the sulfur is present in a variety of forms and that it is generally deleterious in most forms when occurring in the final alcohol. Sulfur-containing contaminants cause both odor and color problems as well as act as accelerators to give unwanted properties to the alcohols. The finished alcohol should contain a minimum of sulfur-containing compounds, and it has in the past been necessary to resort to elaborate and expensive alcohol purification procedures. These purifications had been especially necessary if the ester is manufactured in stainless steel equipment and unreacted or excess alcohol is recycled to the esterification zone. A number of types of sulfur-containing impurities are believed to be present and among those probable in an iso-octyl alcohol product prepared from a $C_7$ olefin, are iso-octyl mercaptan, iso-octyl sulfide, diethyl sulfide, diethyl disulfide, dipropyl sulfide, dipropyl disulfide, butyl sulfide, as well as the corresponding sulfinic acids, sulfonic acids, sulfoxides and sulfones.

In brief, therefore, the small amounts of sulfur appearing in the alcohol product, when this is to be used for plasticizing purposes, play an important role in degrading the resulting ester and making it unfit for use; acetalization appears to be catalyzed by these small amounts, and a sulfur content of greater than about 10–15 parts per million makes the alcohol unsuitable for this purpose.

Thus, in a 100 B/D plant operation manufacturing octyl alcohol from $C_7$ olefin and passing the intermediate aldehyde product over freshly prepared molybdenum sulfide catalyst supported on activated carbon, the first 14,000 gallons of alcohol produced analyzed for about 12 parts per million of sulfur and produced an ester color of 0.35. Even with this extremely small amount of sulfur, the alcohol was thus unsuitable for use as a plasticizer intermediate for later esterification with phthalic anhydride. The ester color, as indicated above, is a measure of the optical density of the phthalate ester as produced under the prescribed conditions, and is affected by the presence of extremely small amounts of sulfur impurities.

It has, in the past, been a difficult and expensive process to remove the undesirable products present in the carbonylation alcohol, either directly from the latter, or from the feed stream to the carbonylation process.

The most expedient method of sulfur removal would be to treat the feed to the carbonylation, or aldehyde synthesis zone with such agents that have a known affinity for sulfur, such as washing with caustic. However, this treatment has been found inadequate, for in the first place only acidic forms of sulfur are thus removed, and also, even this removal is inadequate. Though it is a relatively simple matter to decrease sulfur content of a hydrocarbon by caustic scrubbing down to a fraction of a percent, caustic scrubbing has not been found adequate to reduce even acidic sulfur to less than 10 parts per million, as required for the preparation of plasticizing alcohols. The most readily available olefinic feed stocks for the oxonation reaction are selected hydrocarbon streams derived from petroleum refinery sources, and these streams frequently have sulfur contents as high as 0.1% and more; a substantial proportion of this sulfur is in a form not amenable to caustic treatment. The most effective measures in the past have been careful selection of feed stocks for low sulfur content, which thus severely limits the availability of feed stock for the Oxo process or the use of a second hydrogenation or hydrodesulfurization step for treating the finished alcohol. These methods add substantially to the investment and operating costs.

It has now been found that an olefin feed for the carbonylation process of exceptionally high purity and low sulfur content may be prepared by treating the sulfur-containing olefin feed with molten urea. Small amounts of this material have been found to reduce the sulfur content of an olefin from 60 parts per million to 3 parts per million and less. Caustic scrubbing of an olefin, even if carried out with highest efficiency, would result in a product of considerably higher sulfur content.

In accordance with the present invention, therefore, olefin feed for the carbonylation process, particularly feeds which are to be converted into alcohols which in turn are to be converted into plasticizers, i. e. olefins having from 4–12 carbon atoms, are passed through a bed or column of molten urea at or slightly above its melting point. Suitable temperatures are about 270° to 320° F., preferably about 275° to 300° F. At these temperatures the stability of urea is high. Because of the high affinity and specificity of the molten urea for the sulfur contaminants in the olefin, a relatively small amount of urea is adequate to treat effectively a large amount of impure olefin. When such olefin is employed thereafter in the aldehyde-alcohol synthesis reaction, an alcohol product of exceptionally low sulfur content and ester color is produced.

The present invention and its application will best be understood from the more detailed description hereinafter, wherein reference will be had to the accompanying drawing, which is a schematic representation of a system suitable for carrying out a preferred embodiment of the invention. As the latter resides in the treatment of the olefin feed to the Oxo process, and since the latter is now well known in the art, only the olefin treating stage is shown.

Referring now to the drawing, an olefinic compound having from 4–12 carbon atoms, and which may contain up to 100 parts per million of sulfur or more as mercaptan, disulfide and other organically bound forms of sulfur, is passed into the lower portion of treating tower 4 through line 2. Pressure may be necessary to maintain the lower molecular weight olefins in the liquid state. A stream of molten urea is passed to the top of tower 4 through lines 14 and 16 from supply vessel 20. The latter is equipped with suitable heating means to convert urea to the molten state.

Conditions within tower 4 are adjusted so that preferably a liquid-liquid extraction operation is maintained. The tower is insulated and has suitable heating means for keeping the urea in the molten condition. Temperatures within the tower are in the range of about 270–320° F., the lower portion of the range being preferred in order to prevent the volatilization and decomposition of the urea. The ratio of urea to olefin in the tower is preferably about 1:1. Because of the high efficiency of the process, complete treatment of the olefin may be had on a once-through basis, while the urea may be continuously recycled until the impurity build up is large enough to warrant removal of spent urea.

The purified hydrocarbon, containing less than 4 parts per million of sulfur is withdrawn from the upper portion of tower 4 through line 18 and passed to the carbonylation stage for conversion to aldehyde and thereafter to alcohol in the manner previously described. If desired, the sulfur-free hydrocarbon extract may be cooled and water washed before proceeding to the carbonylation step. Molten urea is withdrawn downwardly from vessel 4 through line 6 and recycled via line 10, pump 12, and line 14 to the upper portion of vessel 4. From time to time, a portion of the molten urea may be passed to the regeneration zone and an equivalent amount of urea make-up introduced through line 16.

If desired, the spent urea withdrawn from the extraction system through line 8 may be recovered by spraying the urea into hot water to form a concentrated aqueous urea solution. The sulfur containing contaminants being insoluble in water are removed. The hot aqueous urea solution is cooled to crystallize the urea and separated, dried and returned to the urea storage vessel 20 for re-use.

The process of the present invention may be further illustrated by the following set of specific examples embodying modifications of the invention along with a comparison with a caustic scrubbing operation for the removal of sulfur from a $C_7$ olefin feed. In the specific examples described wherein molten urea is employed, the system was operated as a vapor-liquid system instead of the liquid-liquid system described in the drawing.

*Example 1.*—An olefinic feed stream comprising principally $C_7$ olefins obtained by a careful and controlled distillation of the product obtained in a commercial polymerization process analyzed 61 p. p. m. sulfur.

Ten gallons of the $C_7$ olefin feed stock comprising 61 p. p. m. sulfur were contacted in a tank with 10 gallons of 10% sodium hydroxide solution using rapid and efficient agitation to effect intimate contact of the hydrocarbon and aqueous phases. The operation was conducted at room temperature, and the mixing period was about 10 minutes. After this period of time, agitation was stopped and the mixture allowed to settle. The aqueous layer was withdrawn and discarded. The $C_7$ olefin hydrocarbons were washed with 10 gallons of water to remove residual caustic. The washing cycle was repeated until the water washings were neutral to phenolphthalein indicator.

The $C_7$ olefin hydrocarbon fraction after treatment was analyzed for sulfur and showed about 61 p. p. m. sulfur. It is apparent that very little sulfur, if any, was removed by the scrubbing action of the 10% caustic.

*Example 2.*—An olefinic feed stream comprising principally $C_7$ olefins obtained by a careful and controlled distillation of the product obtained in a commercial polymerization process analyzed 20 p. p. m. sulfur.

Ten pounds of urea were charged to a vessel and heated to a temperature of 285° F. to melt the urea. The molten urea filled the vessel to a depth of about 6 inches. A total of 10.7 pounds of the $C_7$ olefin feed comprising 20 p. p. m. sulfur was vaporized in a separate vessel and the vapors bubbled through the molten urea via a number of minute orifices and collected and condensed overhead. The operation was conducted at atmospheric pressure and the feed rate was about 5.3 pounds of olefin feed per hour. Contact time between hydrocarbon vapors and molten urea was of the order of 1–2 seconds. A sample of the recovered hydrocarbon was taken for sulfur analysis and showed 3 p. p. m. sulfur. The remainder of the recovered hydrocarbon was recycled through the molten urea and the process repeated for 2 additional cycle periods. After the fourth cycle period the product was analyzed for sulfur and showed 4 p. p. m. sulfur, representing no further reduction in sulfur content.

*Example 3.*—An olefinic feed stream comprising principally $C_7$ olefins obtained by a careful and controlled distillation of the product obtained in a commercial polymerization process analyzed 20 p. p. m. sulfur.

Ten pounds of urea were charged to a vessel and heated to a temperature of about 285° F. to melt the urea. The molten urea filled the vessel to a depth of about 6 inches. A total of 24.6 pounds of the $C_7$ olefin feed comprising 20 p. p. m. sulfur was vaporized in a separate vessel and the vapors bubbled through the molten urea via a number of minute orifices and collected and condensed overhead. The operation was conducted at atmospheric pressure and the feed rate was about 5.3 pounds of olefin feed per hour. The contact time between hydrocarbon vapors and molten urea was about 1–2 seconds. When 6.1 pounds of olefin feed had been treated a sample of the hydrocarbon condensate was taken for analysis and showed 3 p. p. m. sulfur. A sample of the hydrocarbon condensate taken after 24.6 pounds of feed had been processed analyzed 3 p. p. m. sulfur. It is apparent that the capacity of the molten urea as a solvent for the sulfur compounds in this operation has not been attained and that the urea may be used to treat additional amounts of the feed.

Examples 2 and 3 show that the sulfur is rapidly and efficiently removed from the hydrocarbon feed stream by the molten urea in once-through operation, irrespective of the form of sulfur present. The volume of feed which can be treated by a fixed charge of urea is dependent on the impurity level of the original hydrocarbon feed stream.

To indicate the effect of sulfur impurities upon the recycle ester color of the octyl phthalate, the table below indicates that at a sulfur content as low as 0.008%, or 80 parts per million, the recycle ester color made the alcohol completely unsuitable for this service, for it produced an ester color of 1.95. Minimum standards for specification alcohol suitable for colorless plasticizers are an ester color of 0.15. Ester color is expressed in terms of color absorbency of the ester at a standard wave length of light, a high value indicating a darkened, low quality ester product. The wave length used for studying the diisooctyl phthalate ester is 4470 A.

To show that high ester color is directly associated with sulfur, particularly mercaptan sulfur, the following data are presented.

| | P. p. m. Sulfur added | Ester Color @ 4470 A. |
|---|---|---|
| Synthetic mixture of n-heptyl mercaptan in 2-ethyl hexanol. | 0 | 0.03 |
| | 2 | 0.09 |
| | 5 | 0.16 |
| | 10 | 0.38 |
| Synthetic mixture of iso-octyl alcohol +$C_8$ Oxo mercaptan. | 0 | 0.03 |
| | 3 | 0.15 |
| | 10 | 0.50 |

Thus, an alcohol whose sulfur content has been lowered to 5 parts per million or less produces an ester with desirable low color characteristics. By reducing the sulfur content of the olefin to less than 4 parts per million in accordance with the present invention, alcohols of plasticizing quality may now be obtained from the carbonylation reaction.

While the use of molten urea as a solvent for the efficient and rapid removal of sulfur from hydrocarbon feed streams has been specifically demonstrated and a preferred method of operation described, it is apparent that molten urea may be used in a number of petroleum refinery and chemical operations. For example, small objectionable amounts of residual catalyst (principally aluminum chloride or aluminum bromide) can be effectively removed from a resin product stream obtained by polymerizing suitable hydrocarbon feed streams by treatment with molten urea to yield a high quality resin product. Naphthas, kerosene, and gas oils may be up-graded by treatment with molten urea to remove organic sulfur and organic nitrogen compounds and other compounds having functional polar groups. The ash content of heavy gas oils and residuum may be materially reduced by the preferential solvent action of molten urea for the inorganic components. The peroxides formed in di-olefin or other highly unsaturated feed streams through normal operation can be reduced by treatment of these streams with molten urea. Refinery gas streams containing large amounts of $C_2$ and $C_3$ molecular weight components to be used in subsequent polymerization processes can be made free from contaminants by treatment with molten urea.

Other modifications and modes of application within the spirit of the invention will be apparent to those skilled in the art.

What is claimed is:

1. An improved process for purifying hydrocarbon streams contaminated with minor amounts of non-hydrocarbonaceous impurities which comprises heating urea to its molten state, contacting said hydrocarbon stream with said molten urea, said molten urea being in the liquid phase separating a hydrocarbon product substantially completely free from such contaminants from a contaminated molten urea product and recovering a hydrocarbon product substantially completely free of said contaminants.

2. An improved process for purifying hydrocarbon streams contaminated with minor proportion of non-hydrocarbonaceous organic compounds which comprises heating urea to its molten state, treating said hydrocarbon streams with said molten urea in a treating zone, maintaining said molten urea as a liquid in said zone, withdrawing a contaminant-free hydrocarbon product and a contaminant containing urea product from said zone and recovering a contaminant-free hydrocarbon product.

3. The process of claim 2 wherein said hydrocarbon streams are substantially olefinic.

4. The process of claim 3 wherein said contaminants comprise organic sulfur compounds.

5. In a carbonylation process wherein olefins, carbon monoxide and hydrogen are contacted in an initial carbonylation zone with a cobalt carbonylation catalyst under conditions to produce oxygenated reaction products comprising aldehydes, and wherein said reaction products are further subjected to a hydrogenation reaction to produce alcohols having one more carbon atom per molecule than said olefins, and wherein said olefin is contaminated with minor amounts of sulfur comprising impurities, the improvement which comprises heating urea to its molten state and contacting said olefin feed with said molten urea prior to passing of said feed to said carbonylation zone.

6. The process of claim 5 wherein said olefin product is contacted with said molten urea at a temperature of about 270–320° F.

7. The process of claim 5 wherein said urea and said olefins are both maintained in a liquid state during said contacting.

8. The process of claim 5 wherein said contaminated olefin feed is a heptene fraction containing less than 100 parts per million of sulfur.

9. An improved process for purifying hydrocarbon stream contaminated with minor amounts of sulfur-comprising impurities which comprises heating urea to its molten state, contacting said hydrocarbon stream with said molten urea in the liquid phase in a treating zone, said molten urea being the sole sulfur removal agent, withdrawing a sulfur-contaminated urea stream and a sulfur-free hydrocarbon stream from said treating zone, and recovering a hydrocarbon product substantially completely free of sulfur contaminant.

10. The process of claim 9 wherein said hydrocarbon stream is substantially olefinic.

References Cited in the file of this patent

UNITED STATES PATENTS

| | | |
|---|---|---|
| 1,899,042 | Malisoff | Feb. 28, 1933 |
| 2,253,638 | McKennon | Aug. 26, 1941 |
| 2,423,556 | Feibelmann | July 8, 1947 |
| 2,445,655 | Allen et al. | July 20, 1948 |
| 2,595,786 | Hale et al. | May 6, 1952 |
| 2,642,423 | Gorin | June 16, 1953 |
| 2,670,344 | Fetterly | Feb. 23, 1954 |